(12) United States Patent
Mao et al.

(10) Patent No.: US 8,582,281 B2
(45) Date of Patent: Nov. 12, 2013

(54) DISPLAY DEVICE, ASSEMBLY METHOD FOR THE DISPLAY DEVICE, ASSEMBLY STRUCTURE OF TWO FRAMES AND ASSEMBLY METHOD FOR THE ASSEMBLY STRUCTURE OF TWO FRAMES

(75) Inventors: Xin-Lei Mao, Suzhou (CN); Xian-You Jiao, Suzhou (CN)

(73) Assignees: Au Optronics (Suzhou) Corp., Ltd., Suzhou (CN); Au Optronics Corp., Hsinchu (TW)

( * ) Notice: Subject to any disclaimer, the term of this patent is extended or adjusted under 35 U.S.C. 154(b) by 357 days.

(21) Appl. No.: 12/984,946

(22) Filed: Jan. 5, 2011

(65) Prior Publication Data
US 2011/0317344 A1 Dec. 29, 2011

(30) Foreign Application Priority Data

Jun. 24, 2010 (CN) .......................... 2010 1 0213519

(51) Int. Cl.
*G02F 1/1333* (2006.01)
*H05K 5/00* (2006.01)
*H05K 7/00* (2006.01)

(52) U.S. Cl.
USPC ....................................... 361/679.21; 349/58

(58) Field of Classification Search
USPC ........ 361/679.21–679.3; 313/582; 349/58–60
See application file for complete search history.

(56) References Cited

U.S. PATENT DOCUMENTS

| | | | |
|---|---|---|---|
| 6,480,245 B1 * | 11/2002 | Sakamoto et al. | 349/59 |
| 6,542,206 B1 * | 4/2003 | Saito | 349/58 |
| 7,178,967 B2 * | 2/2007 | Kim | 362/633 |
| 7,665,879 B2 * | 2/2010 | Hsieh | 362/633 |
| 7,697,086 B2 * | 4/2010 | Yang et al. | 349/58 |
| 7,714,952 B2 * | 5/2010 | Chang | 349/58 |
| 7,777,827 B2 * | 8/2010 | Park | 349/58 |
| 7,948,574 B2 * | 5/2011 | Chen et al. | 349/58 |
| RE44,008 E * | 2/2013 | Sugahara et al. | 362/633 |
| 2001/0003471 A1 * | 6/2001 | Lee et al. | 349/58 |
| 2001/0050731 A1 * | 12/2001 | An et al. | 349/58 |
| 2002/0135294 A1 * | 9/2002 | Fujishiro et al. | 313/493 |
| 2003/0112379 A1 * | 6/2003 | Jung | 348/789 |
| 2004/0246401 A1 * | 12/2004 | Lee et al. | 349/58 |
| 2005/0168954 A1 * | 8/2005 | Kim | 361/725 |

(Continued)

FOREIGN PATENT DOCUMENTS

| CN | 201184547 Y | 1/2009 |
|---|---|---|
| CN | 101414074 | 4/2009 |

(Continued)

*Primary Examiner* — Adrian S Wilson
(74) *Attorney, Agent, or Firm* — WPAT, PC; Justin King (57) ABSTRACT

A display device includes a first frame, a second frame, a backlight module and a display panel. The first frame has two plates separated with each other. Each plate includes a first bottom and a first side wall connected with the first bottom, wherein a first joint part is disposed at the first side wall. The second frame has a second side wall and a supporting part extended from the second side wall toward an inside of the second frame. Second joint parts corresponding to the first joint parts are disposed at the second side wall. The first frame and the second frame are assembled by combinations of the first joint parts and the second joint parts. The backlight module is disposed between the first bottoms and the supporting part. The display panel is disposed on the supporting part.

13 Claims, 7 Drawing Sheets

(56) References Cited

U.S. PATENT DOCUMENTS

| | | | |
|---|---|---|---|
| 2006/0055839 A1* | 3/2006 | Hirao et al. | 349/58 |
| 2006/0139271 A1* | 6/2006 | Okuda | 345/88 |
| 2006/0146486 A1* | 7/2006 | Wikstrom et al. | 361/681 |
| 2006/0152664 A1* | 7/2006 | Nishio et al. | 349/150 |
| 2006/0221268 A1* | 10/2006 | Ko et al. | 349/58 |
| 2007/0132917 A1* | 6/2007 | Kim et al. | 349/65 |
| 2007/0139872 A1* | 6/2007 | Lee et al. | 361/681 |
| 2007/0273809 A1* | 11/2007 | Lee | 349/58 |
| 2008/0048958 A1* | 2/2008 | Kim et al. | 345/87 |
| 2008/0204987 A1* | 8/2008 | Sakata | 361/681 |
| 2009/0128732 A1 | 5/2009 | Hamada | |
| 2010/0061044 A1* | 3/2010 | Zou et al. | 361/679.01 |
| 2010/0135039 A1 | 6/2010 | Li et al. | |

FOREIGN PATENT DOCUMENTS

| | | |
|---|---|---|
| CN | 101749568 | 6/2010 |
| JP | 2001-249619 | 9/2001 |
| JP | 2005331911 | 12/2005 |
| TW | M306016 | 2/2007 |

\* cited by examiner

DISPLAY DEVICE, ASSEMBLY METHOD FOR THE DISPLAY DEVICE, ASSEMBLY STRUCTURE OF TWO FRAMES AND ASSEMBLY METHOD FOR THE ASSEMBLY STRUCTURE OF TWO FRAMES

BACKGROUND

1. Field of the Invention

The present invention relates to an assembly structure of two frames, and more particularly to an assembly structure of two frames for a display device and a display device using the same.

2. Description of the Related Art

Recently, traditional cathode ray tube display devices have been gradually replaced by thin display devices. Generally, the thin display devices include liquid crystal display devices, plasma display devices, electrophoretic display devices and organic light-emitting diode display devices etc., among which the liquid crystal display devices are used most widely.

The liquid crystal display device includes a liquid crystal display panel, a backlight module for providing a display light source and a housing for receiving the liquid crystal display panel and the backlight module. The housing includes a back bezel for covering a bottom of the backlight module and a front frame combined with the back bezel.

Figure 1:
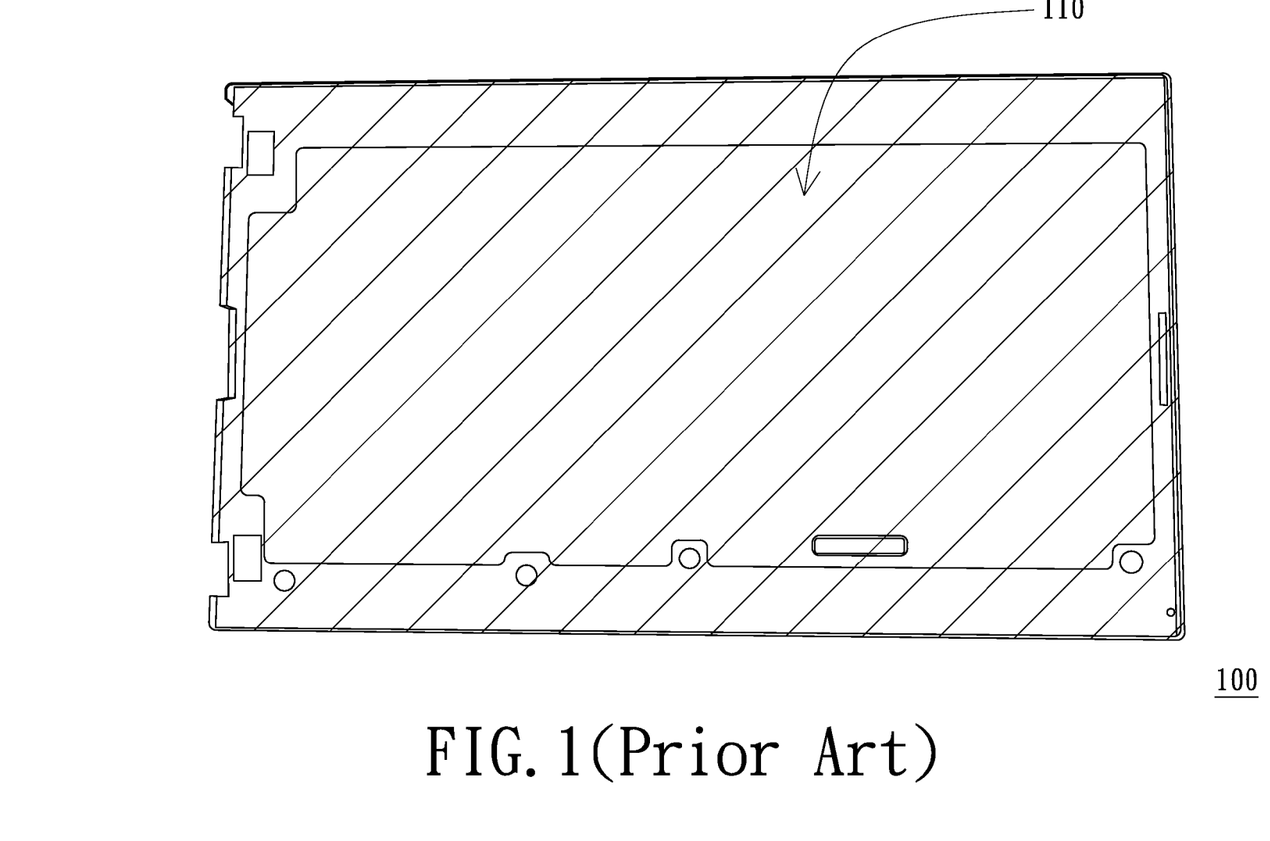
FIG. 1 is a schematic view of a conventional back bezel.

FIG. 1 is a schematic view of a conventional back bezel. Referring to FIG. 1, the conventional back bezel 100 is made of a metallic sheet or formed by stamping a plurality of metallic sheets after the metallic sheets being combined. However, if the back bezel 100 is fabricated by above mentioned manners, a lot of metal is needed due to the bottom of the back bezel covering the bottom of the backlight module wholly. Therefore, the cost of the back bezel 100 is high. In addition, if the back bezel 100 is composed of the plurality of metallic sheets, the plurality of metallic sheets would be combined firstly, and that would consume additional time and cost.

BRIEF SUMMARY

The present invention provides a display device to reduce production cost.

The present invention provides an assembly method for the display device to reduce production cost.

The present invention provides an assembly structure of two frames to reduce production cost.

The present invention provides an assembly method for the assembly structure of two frames to reduce production cost.

To achieve at least one of the above-mentioned advantages or other advantages, the present invention provides a display device. The display device includes a first frame, a second frame, a backlight module and a display panel. The first frame has two plates separated with each other, each of the plates includes a first bottom and a first side wall connected with the first bottom, and at least one first joint part is disposed at the first side wall. The second frame has a second side wall and a supporting part extended from the second side wall toward an inside of the second frame. A plurality of second joint parts corresponding to the first joint parts are disposed at the second side wall, and the first frame and the second frame are assembled by combinations of the first joint parts and the second joint parts. The backlight module is disposed between the first bottoms and the supporting part. The display panel is disposed on the supporting part.

In an embodiment of the present invention, the first frame and the second frame are rectangular respectively, and the plates are L-shaped respectively.

In an embodiment of the present invention, material of the first frame includes metal, and material of the second frame includes plastic.

In an embodiment of the present invention, the plates are a first plate and a second plate, the first side wall of the first plate has at least one first end, the first side wall of the second plate has at least a second end adjacent to the first end. The first end has a first extending portion extended toward the second plate, and the second end has a second extending portion extended toward the first plate. The first extending portion has a third joint part, and the second extending portion has a fourth joint part. The third joint part and the fourth joint part are arranged perpendicular to the first bottoms, and the second frame has a plurality of seventh joint parts jointed with the third joint part and the fourth joint part.

In an embodiment of the present invention, the first joint parts are latching holes, and the second joint parts are latching hooks.

In an embodiment of the present invention, the first joint parts are latching hooks, and the second joint parts are latching holes.

In an embodiment of the present invention, the second frame is located inside of the first frame.

In an embodiment of the present invention, the display device further includes a third frame, and the third frame has a third side wall and an extending portion extended from the third side wall toward an inside of the third frame. The extending portion covers a portion of the display panel, and the first side walls of the first frame respectively have at least one fifth joint part. The third side wall has a plurality of sixth joint parts corresponding to the fifth joint parts, the third side wall is located outside of the first side wall, and the third side wall and the first side wall are assembled by combinations of the fifth joint parts and the sixth joint parts.

The present invention also provides an assembly method for the display device, which includes the following steps. Firstly, a fixture having a groove is provided, wherein a shape of the groove corresponds to that of the first frame. Next, the first frame is disposed in the groove. Then, the backlight module is disposed in the first frame. Afterwards, the first frame is assembled with the second frame by combinations of the first joint parts and the second joint parts. Then, the display panel is disposed on the supporting part of the second frame.

In an embodiment of the present invention, the assembly method further includes providing a third frame having a third side wall and an extending portion extended from the third side wall toward an inside of the third frame; and combining the third side wall and the first side wall, wherein the extending portion covers a portion of the display panel, and the second side wall and the third side wall are located at opposite sides of the first side wall.

In an embodiment of the present invention, the combined first frame and second frame are taken out from the groove before the display panel is disposed on the supporting part of the second frame.

The present invention also provides an assembly structure of two frames, which includes a first frame and a second frame. The first frame has two plates separated with each other, and each of the plates includes a first bottom and a first side wall connected with the first bottom. At least one first joint part is disposed at the first side wall. The second frame has a second side wall, and second joint parts corresponding to the first joint parts are disposed at the second side wall. The first frame and the second frame are assembled by combinations of the first joint parts and the second joint parts.

The present invention further provides an assembly method for the assembly structure of two frames, which includes the following steps. Firstly, a fixture having a groove is provided, wherein a shape of the groove corresponds to that of the first frame. Next, the first frame is disposed in the groove. Then, the first frame is assembled with the second frame by combinations of the first joint parts and the second joint parts.

In the assembly structure of two frames and the assembly method thereof, the two separated plates of the first frame can be directly fixed by the second frame. Therefore, an additional step of combining the two separated plates can be omitted, and thus the production cost of the assembly structure can be reduced. In addition, in the display device and the assembly method thereof, the two separated plates of the first frame can be directly fixed by the second frame. Therefore, an additional step of combining the two separated plates can be omitted, and thus the production cost can be reduced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 2:
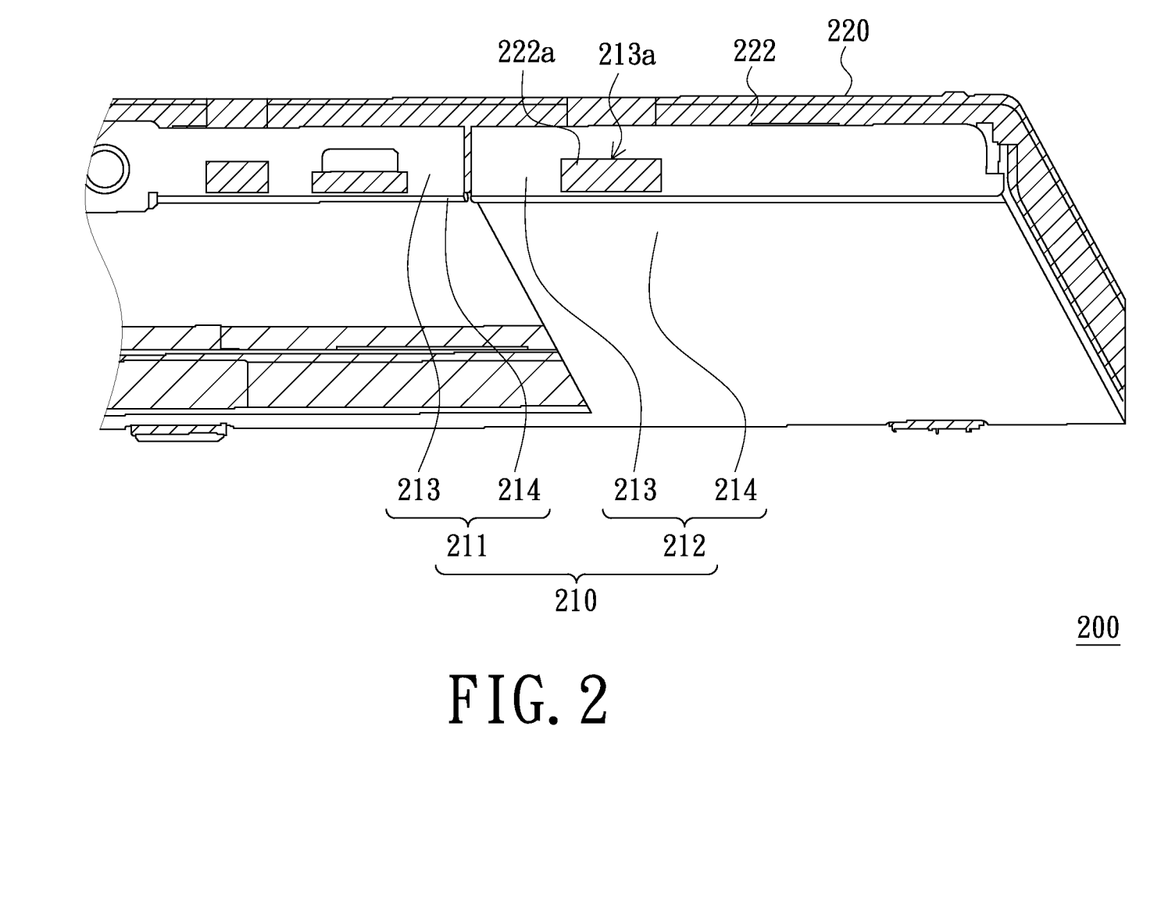
FIG. 2 is a schematic three dimensional view showing a portion of an assembly structure of two frames in accordance with an embodiment of the present invention.
Figure 3:
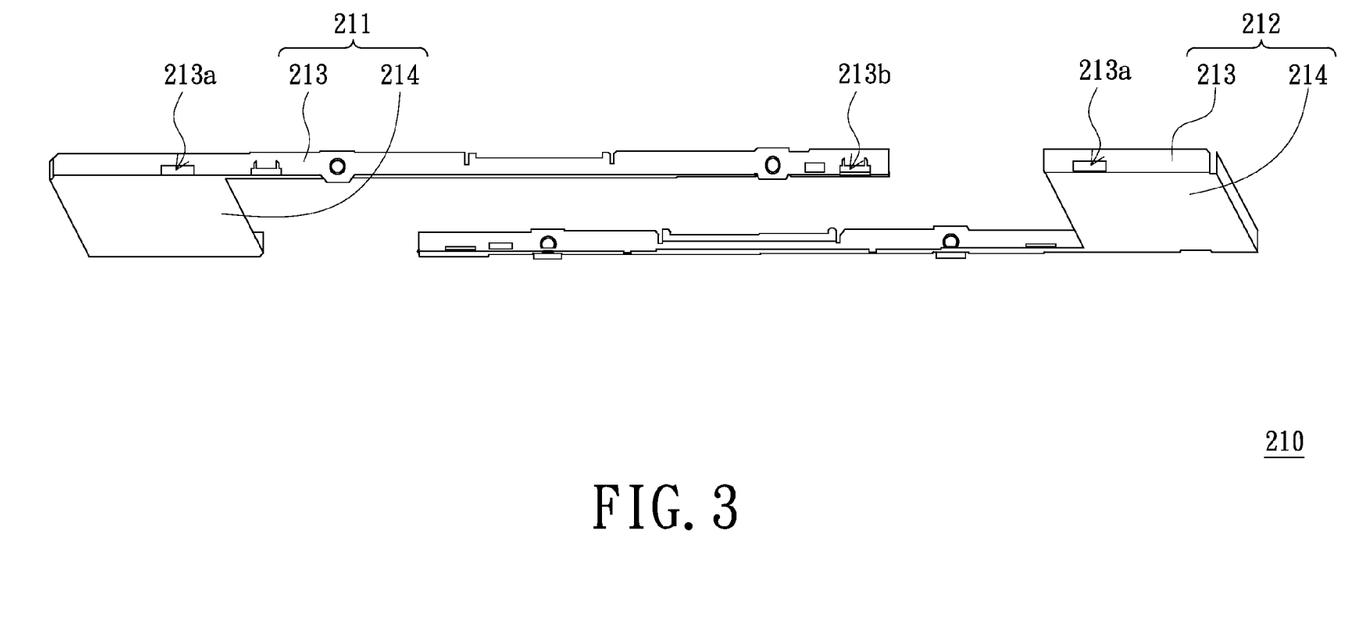
FIG. 3 is a schematic three dimensional view of a first frame in accordance with an embodiment of the present invention.

FIG. 2 is a schematic three dimensional view showing a portion of an assembly structure of two frames in accordance with an embodiment of the present invention. FIG. 3 is a schematic three dimensional view of a first frame in accordance with an embodiment of the present invention. Referring to FIGS. 2 and 3, the assembly structure 200 of two frames includes a first frame 210 and a second frame 220. The first frame 210 includes two plates (i.e. a first plate 211 and a second plate 212) separated with each other. Each of the first plate 211 and the second plate 212 has a first side wall 213. At least one first joint part 213a is disposed at the first side wall 213, and in the embodiment, multiple first joint parts 213a are taken as an example. The second frame 220 includes a second side wall 222. Second joint parts 222a corresponding to the first joint parts 213a are disposed at the second side wall 222. The first frame 210 and the second frame 220 are assembled by combinations of the first joint parts 213a and the second joint parts 222a.

In the embodiment, the first frame 210 and the second frame 220 are rectangular respectively. The first plate 211 and the second plate 212 are arranged in a rectangle. In other words, the first plate 211 and the second plate 212 can be L-shaped respectively. In addition, the first joint parts 213a can be latching holes, and the second joint parts 222a can be latching hooks. In an alternative embodiment, the first joint parts 213a can be latching hooks, and the second joint parts 222a can be latching holes. It should be pointed out that shapes of the latching holes or latching hooks shown by FIGS. 2 and 3 are for exemplary purposes, and the present invention is not limited herein. In addition, in the embodiment, the second frame 220 is, for example, located inside of the first frame 210. In an alternative embodiment, the second frame 220 can be located outside of the first frame 210.

Figure 4A:
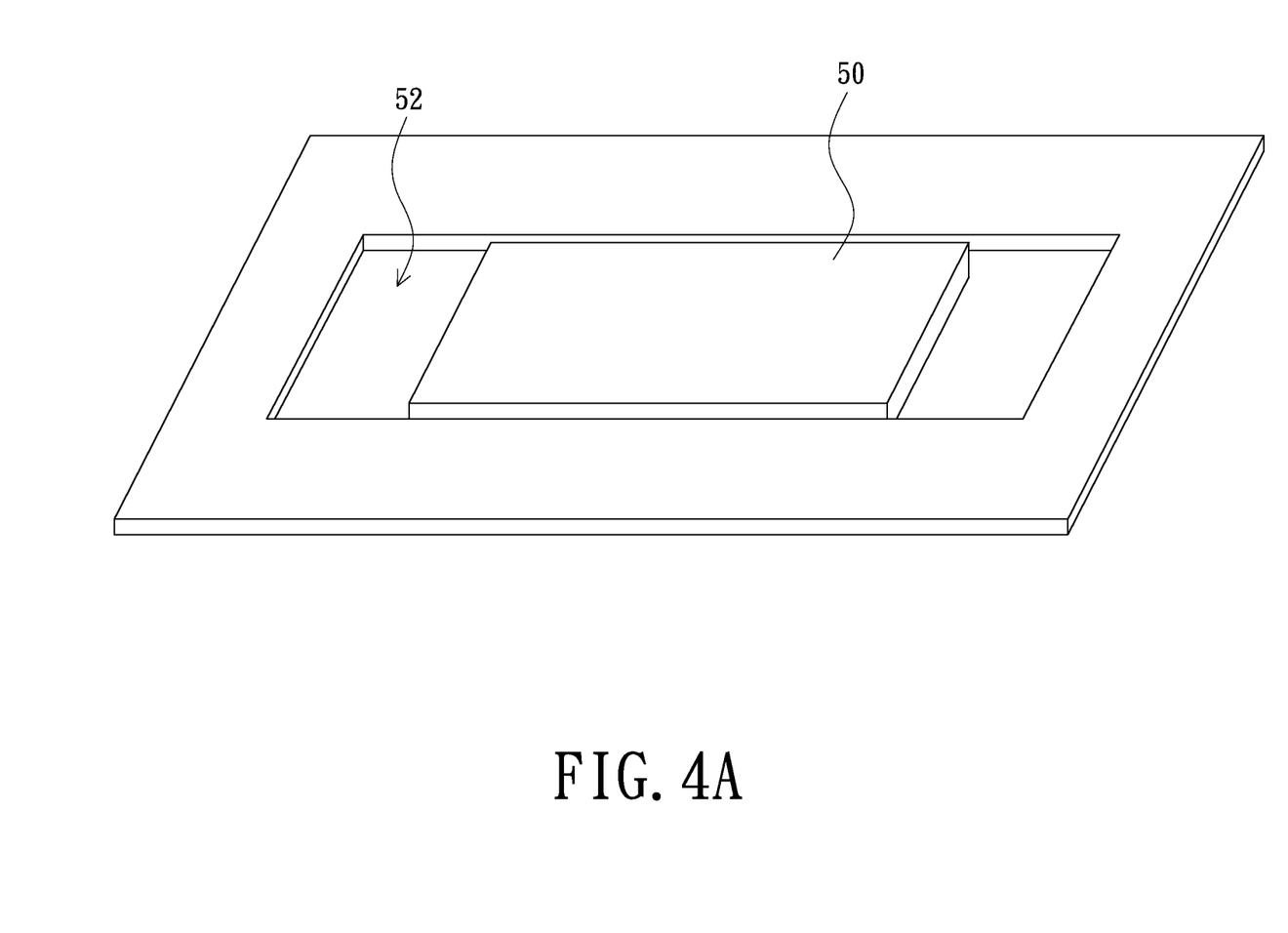
FIGS. 4A and 4B are schematic views showing an assembly method for the assembly structure of the two frames in accordance with an embodiment of the present invention.
Figure 4B:
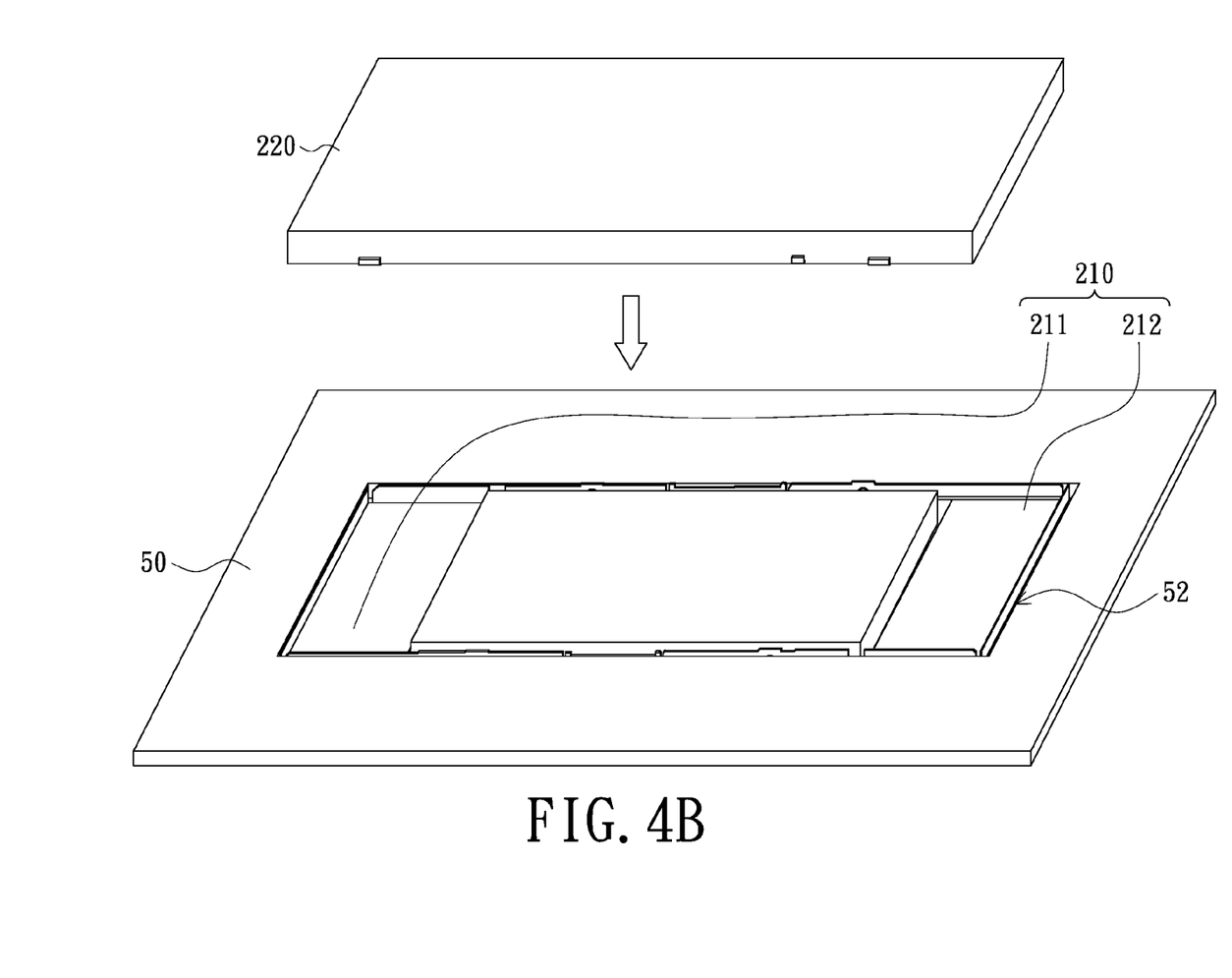

FIGS. 4A and 4B are schematic views showing an assembly method for the assembly structure of the two frames in accordance with an embodiment of the present invention. The assembly method for the assembly structure 200 includes the following steps. Firstly, as shown in FIG. 4A, a fixture 50 is provided. The fixture 50 can be a flat plate and have a groove 52. A shape of the groove 52 corresponds to that of the first frame 210 of FIG. 3. Next, as shown in FIG. 4B, the first frame 210 is disposed in the groove 52, so that the first plate 211 and the second plate 212 of the first frame 210 can be positioned temporarily. Then, the second joint parts 222a of the second frame 220 are combined with the first joint parts 213a of the first frame 210, so that the first frame 210 is fixed by the second frame 220. Afterwards, the combined first frame 210 and second frame 220 are taken out from the groove 52, so that the assembly structure 200 of FIG. 2 is obtained.

In the assembly structure 200 and the assembly method thereof, the first plate 211 and the second plate 212 can be directly fixed by the second frame 220. Therefore, it is unnecessary to combine the first plate 211 with the second plate 212 before combining the first frame 210 and the second frame 220. Consequently, an additional step of combining the first plate 211 with the second plate 212 can be omitted, and assembly efficiency of the first frame 210 and the second frame 220 can be enhanced. Thus, the production cost of the assembly structure 200 can be reduced.

The assembly structure 200 can be used in a display device for exemplary purposes, and the present invention is not limited herein.

Figure 5:
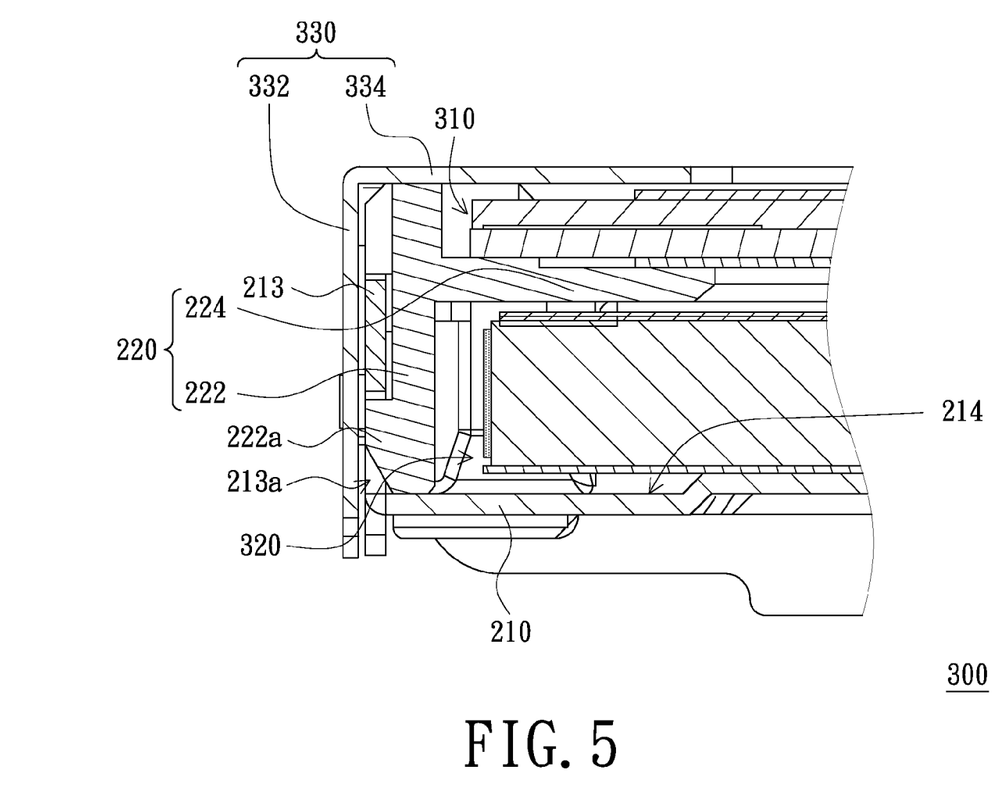
FIG. 5 is a schematic cross-sectional view showing a portion of a display device in accordance with an embodiment of the present invention.

FIG. 5 is a schematic cross-sectional view showing a portion of a display device in accordance with an embodiment of the present invention. Referring to FIGS. 3 and 5, the display device 300 of the embodiment includes a display panel 310, a backlight module 320, the first frame 210 and the second frame 220. The first plate 211 and the second plate 212 can further include a first bottom 214 connected with the first side wall 213. The second frame 220 can further include a supporting part 224 extended from the second side wall 222 toward an inside of the second frame 220. The backlight module 320 is disposed between the first bottom 214 and the supporting part 224. The display panel 310 is disposed on the supporting part 224. The backlight module 320 can include, but not limited to, a light source, a light guide plate, optical films and a reflecting sheet.

Material of the first frame 210 can include, but not limited to, metal, and material of the second frame 220 can include, but not limited to, plastic. In addition, in the embodiment, the display device 300 can further include a third frame 330. The third frame 330 includes a third side wall 332 and an extending portion 334 extended from the third side wall 332 toward an inside of the third frame 330. The extending portion 334 covers a portion of the display panel 310. For example, the extending portion 334 covers a periphery of the display panel 310 and exposes a display region of the display panel 310.

Each of the first walls 213 of the first plate 211 and the second plate 212 has at least one fifth joint part 213b. The third side wall 332 has a plurality of sixth joint parts (not shown) corresponding to the fifth joint parts 213b. The third side wall 332 is located outside of the first side wall 213. The third side wall 332 and the first side wall 213 are assembled by combinations of the fifth joint parts 213b and the sixth joint parts. The second side wall 222 and the third side wall 332 are located at opposite sides of the first side wall 213. In the embodiment, the fifth joint parts 213b can be latching holes, and the sixth joint parts can be latching hooks. In an alternative embodiment, the fifth joint parts 213b can be latching hooks, and the sixth joint parts can be latching holes.

An assembly method for the display device 300 includes the following steps. Firstly, as shown in FIG. 4A, the fixture 50 is provided. Next, as shown in FIG. 4B, the first frame 210 is disposed in the groove 52. Then, as shown in FIG. 5, the backlight module 320 is disposed in the first frame 210. Afterwards, the second joint parts 222a of the second frame 220 are combined with the first joint parts 213a of the first frame 210. Next, as shown in FIG. 5, the display panel 310 is disposed on the supporting part 224 of the second frame 220.

Before the display panel 310 is disposed on the supporting part 224 of the second frame 220, the combined first frame 210 and second frame 220 can be taken out from the groove 52, and then the display panel 310 is disposed on the supporting part 224 of the second frame 220. In addition, the assembly method for the display device 300 can further include combining the third side wall 332 of the third frame 330 with the first side wall 213 of the first frame 210.

In the display device 300 and the assembly method thereof, the first plate 211 and the second plate 212 can be directly fixed by the second frame 220. Therefore, it is unnecessary to combine the first plate 211 with the second plate 212 before the combination of the first frame 210 and the second frame 220. Consequently, an additional step of combining the first plate 211 with the second plate 212 can be omitted, and assembly efficiency of the display device 300 can be enhanced. Thus, the production cost can be reduced. In addition, the bottoms 214 of the first plate 211 and the second plate 212 of the first frame 210 do not cover the bottom of the backlight module 320 wholly, and therefore an amount of the material for forming the first plate 211 and the second plate 212 can be reduced. As such, the production cost can be further reduced.

Figure 6:
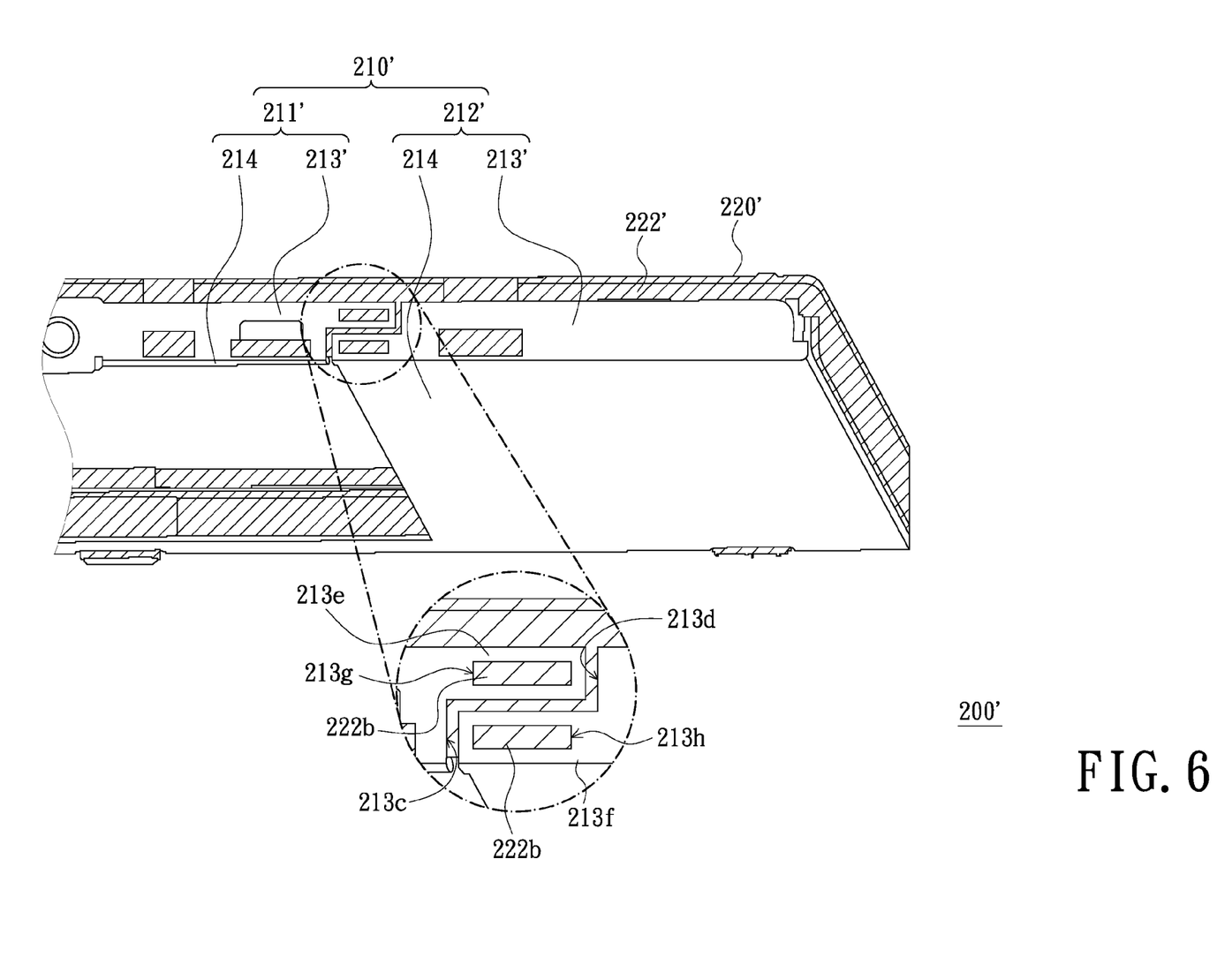
FIG. 6 is a side, schematic view of an assembly structure of two frames in accordance with another embodiment of the present invention.

FIG. 6 is a side, schematic view of an assembly structure of two frames in accordance with another embodiment of the present invention. Referring to FIG. 6, the assembly structure 200' of two frames is similar to the assembly structure 200 of two frames, and only the difference will be described below. In the embodiment, a first side wall 213' of the first plate 211' of a first frame 210' has at least one first end 213c. A first side wall 213' of a second plate 212' of the first frame 210' has at least one second end 213d adjacent to the first end 213c. The first end 213c has a first extending portion 213e extended toward the second plate 212'. The second end 213d has a second extending portion 213f extended toward the first plate 211'. The first extending portion 213e has a third joint part 213g, the second extending portion 213f has a fourth joint part 213h, and the third joint part 213g and the fourth joint part 213h are arranged perpendicular to the first bottom 214.

In addition, the second side wall 222' of the second frame 220' has a plurality of seventh joint parts 222b corresponding to the third joint part 213g and the fourth joint part 213h. The seventh joint parts 222b are jointed with the third joint part 213g and the fourth joint part 213h. In the embodiment, the third joint part 213g and the fourth joint part 213h can be latching holes, and the seventh joint parts 222b can be latching hooks. In an alternative embodiment, the third joint part 213g and the fourth joint part 213h can be latching hooks, and the seventh joint parts 222b can be latching holes.

In the embodiment, because the seventh joint parts 222b are jointed with the third joint part 213g and the fourth joint part 213h, the first plate 211' and the second plate 212' can be combined more firmly. In addition, other advantages of the assembly structure 200' are similar to that of the assembly structure 200, and detail description is omitted herein.

In summary, the present invention at least has one of the following advantages.

1. In the assembly structure of two frames and the assembly method thereof, the two separated plates of the first frame can be directly fixed by the second frame. Therefore, the additional step of combining the two separated plates can be omitted, and thus the production cost can be reduced.

2. In the display device and the assembly method thereof, the two separated plates of the first frame can be directly fixed by the second frame. Therefore, the additional step of combining the two separated plates can be omitted, and thus the production cost can be reduced.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A display device comprising:
a first frame having two plates separated with each other, each of the plates including a first bottom and a first side wall connected with the first bottom, and at least one first joint part being disposed at the first side wall;
a second frame having a second side wall and a supporting part extended from the second side wall toward an inside of the second frame, a plurality of second joint parts corresponding to the first joint parts being disposed at the second side wall, and the first frame and the second frame being assembled by combinations of the first joint parts and the second joint parts so that the two separated plates of the first frame are directly fixed by the second frame;
a backlight module disposed between the first bottoms and the supporting part; and
a display panel disposed on the supporting part.

2. The display device as claimed in claim 1, wherein the first frame and the second frame are rectangular respectively, and the plates are L-shaped respectively.

3. The display device as claimed in claim 1, wherein material of the first frame comprises metal, and material of the second frame comprises plastic.

4. The display device as claimed in claim 1, wherein the plates are a first plate and a second plate, the first side wall of the first plate has at least one first end, the first side wall of the second plate has at least one second end adjacent to the first end, the first end has a first extending portion extended toward the second plate, the second end has a second extending portion extended toward the first plate, the first extending portion has a third joint part, the second extending portion has a fourth joint part, the third joint part and the fourth joint part are arranged perpendicular to the first bottoms, and the second frame has a plurality of seventh joint parts jointed with the third joint part and the fourth joint part.

5. The display device as claimed in claim 1, wherein the first joint parts are latching holes, and the second joint parts are latching hooks.

6. The display device as claimed in claim 1, wherein the first joint parts are latching hooks, and the second joint parts are latching holes.

7. The display device as claimed in claim 1, wherein the second frame is located inside of the first frame.

8. The display device as claimed in claim 7, further comprising a third frame, wherein the third frame has a third side wall and an extending portion extended from the third side wall toward an inside of the third frame, the extending portion covers a portion of the display panel, the first side walls of the first frame respectively have at least one fifth joint part, the third side wall has a plurality of sixth joint parts corresponding to the fifth joint parts, the third side wall is located outside of the first side wall, and the third side wall and the first side wall are assembled by combinations of the fifth joint parts and the sixth joint parts.

9. An assembly method for a display device, comprising:
   providing a display device, the display device comprising a first frame, a second frame, a backlight module and a display panel; the first frame having two plates separated with each other, each of the plates including a first bottom and a first side wall connected with the first bottom, and at least one first joint part being disposed at the first side wall; the second frame having a second side wall and a supporting part extended from the second side wall toward an inside of the second frame, a plurality of second joint parts corresponding to the first joint parts being disposed at the second side wall;
   providing a fixture having a groove, and a shape of the groove corresponding to that of the first frame;
   disposing the first frame in the groove;
   disposing the backlight module in the first frame;
   assembling the first frame with the second frame through combinations of the first joint parts and the second joint parts so that the two separated plates of the first frame are directly fixed by the second frame; and
   disposing the display panel on the supporting part of the second frame.

10. The assembly method as claimed in claim 9, further comprising:
   providing a third frame having a third side wall and an extending portion extended from the third side wall toward an inside of the third frame; and
   combining the third side wall with the first side wall, wherein the extending portion covers a portion of the display panel, and the second side wall and the third side wall are located at opposite sides of the first side wall.

11. The assembly method as claimed in claim 9, wherein the combined first frame and second frame are taken out from the groove before the display panel is disposed on the supporting part of the second frame.

12. An assembly structure of two frames, comprising:
   a first frame having two plates separated with each other, each of the plates including a first bottom and a first side wall connected with the first bottom, and at least one first joint part being disposed at the first side wall; and
   a second frame having a second side wall, a plurality of second joint parts corresponding to the first joint parts being disposed at the second side wall, and the first frame and the second frame being assembled by combinations of the first joint parts and the second joint parts so that the two separated plates of the first frame are directly fixed by the second frame.

13. An assembly method for an assembly structure of two frames, comprising:
   providing an assembly structure of two frames, the assembly structure of two frames comprising a first frame and a second frame; the first frame having two plates separated with each other, each of the plates including a first bottom and a first side wall connected with the first bottom, and at least one first joint part being disposed at the first side wall; the second frame having a second side wall, a plurality of second joint parts corresponding to the first joint parts being disposed at the second side wall;
   providing a fixture having a groove, and a shape of the groove corresponding to that of the first frame;
   disposing the first frame in the groove; and
   assembling the first frame with the second frame through combinations of the first joint parts and the second joint parts so that the two separated plates of the first frame are directly fixed by the second frame.

* * * * *